United States Patent
Sun et al.

(10) Patent No.: US 12,081,495 B2
(45) Date of Patent: Sep. 3, 2024

(54) SRS SIGNALING IN 5G NEW RADIO WIRELESS COMMUNICATIONS

(71) Applicant: Apple Inc., Cupertino, CA (US)

(72) Inventors: Haitong Sun, Cupertino, CA (US); Dawei Zhang, Saratoga, CA (US); Hong He, San Jose, CA (US); Oghenekome Oteri, San Diego, CA (US); Seyed Ali Akbar Fakoorian, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/593,799

(22) PCT Filed: Aug. 5, 2021

(86) PCT No.: PCT/CN2021/110878
§ 371 (c)(1),
(2) Date: Sep. 24, 2021

(87) PCT Pub. No.: WO2023/010414
PCT Pub. Date: Feb. 9, 2023

(65) Prior Publication Data
US 2024/0022366 A1    Jan. 18, 2024

(51) Int. Cl.
*H04L 5/00* (2006.01)
*H04L 27/26* (2006.01)

(52) U.S. Cl.
CPC .......... *H04L 5/0094* (2013.01); *H04L 5/0048* (2013.01); *H04L 5/0051* (2013.01); *H04L 27/2605* (2013.01); *H04L 27/2607* (2013.01)

(58) Field of Classification Search
CPC . H04L 27/2605; H04L 27/261; H04L 5/0048; H04L 5/0051; H04L 5/0094
See application file for complete search history.

(56) References Cited

U.S. PATENT DOCUMENTS

| | | | |
|---|---|---|---|
| 9,923,686 B2* | 3/2018 | Kim | H04L 25/0226 |
| 2012/0106373 A1* | 5/2012 | Gaal | H04B 7/0456 |
| | | | 370/252 |
| 2013/0163530 A1* | 6/2013 | Chen | H04L 25/0202 |
| | | | 370/329 |

(Continued)

FOREIGN PATENT DOCUMENTS

| | | |
|---|---|---|
| CN | 111278130 | 6/2020 |
| WO | 2017/099869 | 6/2017 |

OTHER PUBLICATIONS

Moderator (ZTE), "FL summary #1 on SRS enhancements", 3GPP TSG RAN WG1 Meeting #104b-e, R1-2102674, Apr. 13, 2021, 46 sheets.

(Continued)

*Primary Examiner* — Dung B Huynh
(74) *Attorney, Agent, or Firm* — Fay Kaplun & Marcin, LLP

(57) ABSTRACT

A base station is configured to determine a sounding reference signal (SRS) configuration that has a plurality of cyclic shifts for a comb 8 SRS, a plurality of user equipment (UE) ports for transmitting the comb 8 SRS and a mapping of the plurality of cyclic shifts to the plurality of UE ports. The base station is further configured to transmit the SRS configuration to the UE.

18 Claims, 4 Drawing Sheets

(56) References Cited

U.S. PATENT DOCUMENTS

| | | | |
|---|---|---|---|
| 2015/0304994 A1* | 10/2015 | Kim | H04L 27/2601 |
| | | | 370/280 |
| 2018/0026764 A1* | 1/2018 | Namgoong | H04B 7/0413 |
| | | | 370/329 |
| 2018/0110057 A1* | 4/2018 | Park | H04W 74/0808 |
| 2018/0375636 A1* | 12/2018 | You | H04W 72/20 |
| 2019/0007938 A1* | 1/2019 | Park | H04W 72/21 |
| 2019/0053287 A1* | 2/2019 | Lin | H04L 5/0051 |
| 2019/0174466 A1* | 6/2019 | Zhang | H04L 5/0057 |
| 2019/0215110 A1* | 7/2019 | Yang | H04W 76/27 |
| 2019/0215122 A1* | 7/2019 | Gong | H04J 13/10 |
| 2020/0107317 A1* | 4/2020 | Ryu | H04L 5/0051 |
| 2020/0154239 A1* | 5/2020 | Yamada | H04W 4/029 |
| 2020/0351866 A1* | 11/2020 | Park | H04L 1/1864 |
| 2021/0105156 A1* | 4/2021 | Chuang | H04L 5/0051 |
| 2021/0135922 A1* | 5/2021 | Gao | H04L 5/0051 |
| 2021/0219327 A1* | 7/2021 | Jiang | H04W 72/23 |
| 2021/0281374 A1* | 9/2021 | Kim | H04J 13/0048 |
| 2021/0359819 A1* | 11/2021 | Xiao | H04W 80/02 |
| 2022/0029861 A1* | 1/2022 | Shahmohammadian | |
| | | | H04W 72/0446 |
| 2022/0052813 A1* | 2/2022 | Si | H04W 72/0446 |
| 2022/0053500 A1* | 2/2022 | Han | H04L 5/0073 |
| 2022/0060359 A1* | 2/2022 | Park | H04L 27/2607 |
| 2022/0109479 A1* | 4/2022 | Liu | H04B 7/0636 |
| 2022/0166583 A1* | 5/2022 | Si | H04L 5/0048 |
| 2022/0173865 A1* | 6/2022 | Maamari | H04W 72/23 |
| 2022/0190892 A1* | 6/2022 | Park | H04W 72/12 |
| 2022/0239433 A1* | 7/2022 | Kim | H04L 5/0094 |
| 2022/0263627 A1* | 8/2022 | Takahashi | H04L 5/0094 |
| 2022/0271982 A1* | 8/2022 | Alawieh | H04W 72/0453 |
| 2022/0400480 A1* | 12/2022 | Hao | H04L 27/2602 |
| 2023/0045052 A1* | 2/2023 | Sun | H04L 27/261 |
| 2023/0056145 A1* | 2/2023 | Gao | H04W 72/0453 |
| 2023/0067678 A1* | 3/2023 | Bi | H04L 5/0091 |
| 2023/0136464 A1* | 5/2023 | Wang | H04L 5/0048 |
| | | | 370/329 |
| 2023/0163917 A1* | 5/2023 | Wang | H04L 5/0094 |
| | | | 370/329 |
| 2023/0179372 A1* | 6/2023 | Liu | H04L 5/0051 |
| | | | 370/330 |
| 2023/0188280 A1* | 6/2023 | Ji | H04B 7/0628 |
| | | | 370/329 |
| 2023/0199800 A1* | 6/2023 | Liu | H04L 5/0051 |
| | | | 370/329 |
| 2023/0232264 A1* | 7/2023 | Ren | H04J 11/0036 |
| | | | 370/329 |
| 2023/0239843 A1* | 7/2023 | Liu | H04L 5/0096 |
| | | | 370/329 |
| 2023/0261830 A1* | 8/2023 | Iwai | H04W 72/04 |
| | | | 370/330 |
| 2023/0262526 A1* | 8/2023 | Yuan | H04L 5/0057 |
| | | | 455/422.1 |
| 2023/0269044 A1* | 8/2023 | Gong | H04J 11/005 |
| | | | 370/330 |
| 2023/0291520 A1* | 9/2023 | Iwai | H04L 5/0051 |
| 2023/0308215 A1* | 9/2023 | Khoshnevisan | H04L 5/0048 |
| 2023/0308330 A1* | 9/2023 | Iwai | H04B 1/7143 |
| 2023/0388076 A1* | 11/2023 | Yokomakura | H04L 5/0048 |
| 2023/0413196 A1* | 12/2023 | He | H04W 56/0015 |
| 2023/0421414 A1* | 12/2023 | Sun | H04L 25/0224 |

OTHER PUBLICATIONS

Moderator (ZTE), "FL summary #2 on SRS enhancements", 3GPP TSG RAN WG1 Meeting #104b-e, R1-2103878, Apr. 15, 2021, 40 sheets.

Moderator (ZTE), "FL summary #3 on SRS enhancements", 3GPP TSG RAN WG1 Meeting #104b-e, R1-2103928, Apr. 19, 2021, 14 sheets.

Ericsson, "SRS Performance and Potential Enhancements", 3GPP TSG RAN WG1 Meeting #104b-e, R1-2103444, Apr. 7, 2021, 22 sheets.

Vivo, "Further discussion on SRS enhancement", 3GPP TSG RAN WG1 #104b-e, R1-2102511, Apr. 20, 2021, 22 sheets.

Mediatek Inc., "UL RS design for NR positioning", 3GPP TSG-RAN WG1 #98 Meeting, R1-1908405, Aug. 30, 2019, 4 sheets.

ZTE, "Enhancements on SRS flexibility, coverage and capacity", 3GPP TSG RAN WG1 Meeting #104bis-e, R1-2102665, Apr. 20, 2021, 11 sheets.

Mediatek Inc., "Views on positioning enhancement for Rel-17", 3GPP TSG-RAN WG1 #103 Meeting, R1-2008519, Oct. 13, 2020, 18 sheets.

* cited by examiner

SRS SIGNALING IN 5G NEW RADIO WIRELESS COMMUNICATIONS

BACKGROUND

When establishing the network connection such as, for example, a connection to a 5G new radio (NR) network, a user equipment (UE) transmits a sounding reference signal (SRS) to a next generation NodeB (gNB) to apprise the gNB of the uplink channel conditions. Based on the received SRS signal, the gNB can configure the UE with physical resources to use for communications between the UE and the gNB.

SUMMARY

Some exemplary embodiments are related to a processor of a base station configured to perform operations. The operations include determining a sounding reference signal (SRS) configuration having a plurality of cyclic shifts for a comb 8 SRS, a plurality of user equipment (UE) ports for transmitting the comb 8 SRS and a mapping of the plurality of cyclic shifts to the plurality of UE ports, and transmitting the SRS configuration to the UE.

Other exemplary embodiments are related to a base station having a transceiver configured to communicate with a user equipment (UE) and a processor communicatively coupled to the transceiver and configured to perform operations. The operations include determining a sounding reference signal (SRS) configuration having a plurality of cyclic shifts for a comb 8 SRS, a plurality of user equipment (UE) ports for transmitting the comb 8 SRS and a mapping of the plurality of cyclic shifts to the plurality of UE ports, and transmitting the SRS configuration to the UE.

Still further exemplary embodiments are related to a processor of a base station configured to perform operations. The operations include determining a resource block (RB)-level partial frequency sounding (RPFS) configuration having a configured subband size, an RPFS factor to be applied to the configured subband size, a reduced subband size based on the configured subband size and the RPFS factor and a resulting sounding reference signal (SRS) sequence length based on the configured subband size and the RPFS factor, and transmitting the RPFS configuration to the UE.

Additional Exemplary embodiments are related to a base station having a transceiver configured to communicate with a user equipment (UE) and a processor communicatively coupled to the transceiver and configured to perform operations. The operations include determining a resource block (RB)-level partial frequency sounding (RPFS) configuration having a configured subband size, an RPFS factor to be applied to the configured subband size, a reduced subband size based on the configured subband size and the RPFS factor and a resulting sounding reference signal (SRS) sequence length based on the configured subband size and the RPFS factor, and transmitting the RPFS configuration to the UE.

DETAILED DESCRIPTION

Figure 1:
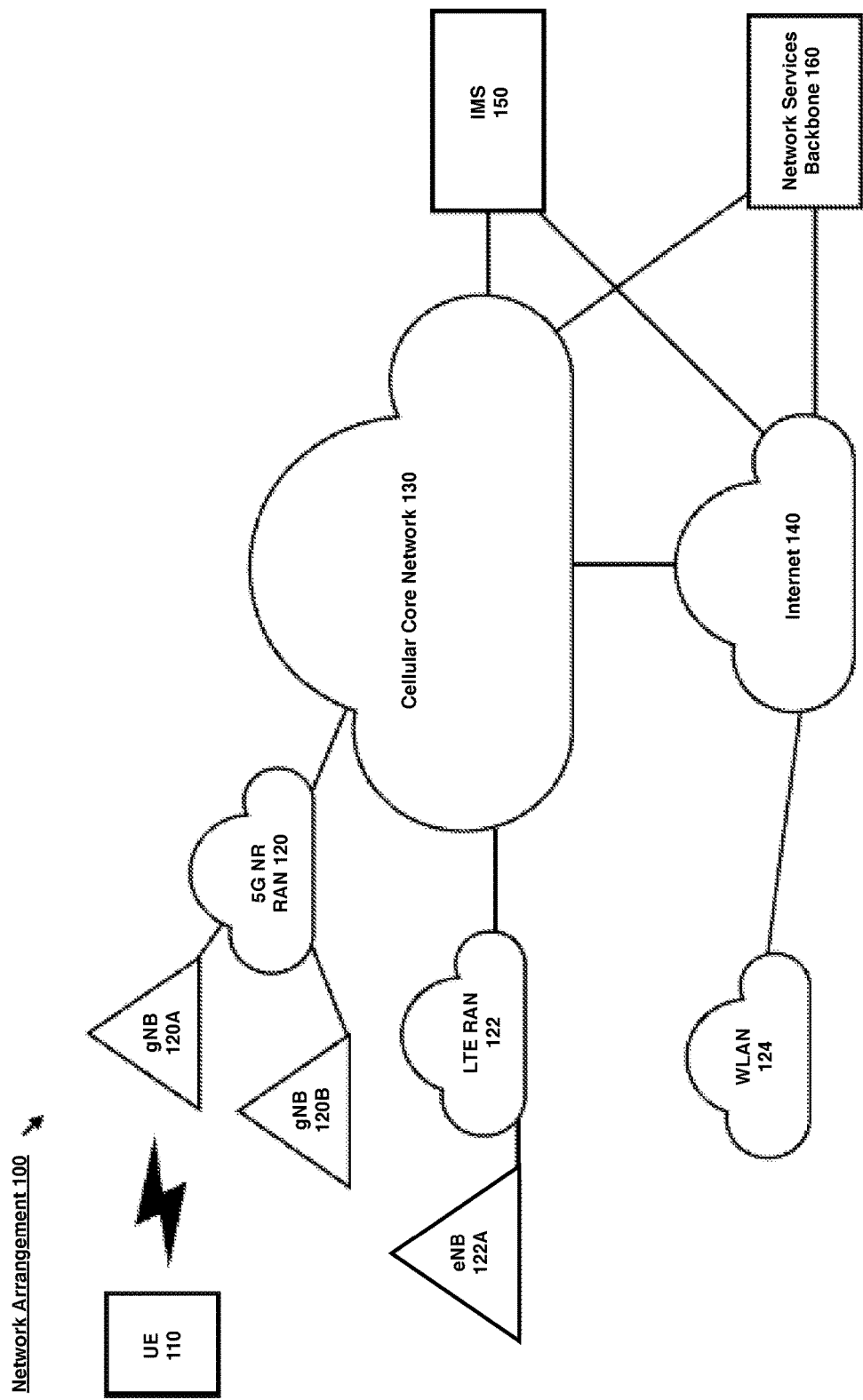
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to the configuration of a sounding reference signal (SRS) to support comb 8 and resource block (RB)-level partial frequency sounding (RPFS).

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

In addition, the exemplary embodiments are described with regard to a 5G New Radio (NR) network. However, reference to a 5G NR network is merely provided for illustrative purposes. The exemplary embodiments may be utilized with any network that implements the functionalities described herein.

To provide more flexibility to a 5G NR network in configuring SRS transmissions it was agreed in Release 16 of 3GPP that SRS transmissions could be transmitted in any symbol of a slot. However, SRS transmissions have been limited to comb 1, 2, or 4, thus limiting the number of UEs that can be multiplexed by a gNB.

According to some exemplary embodiments, a gNB configures a comb 8 SRS transmission and configures a cyclic shift, the number of ports, and a mapping of the cyclic shift to the number of ports for the comb 8 SRS transmission.

Another limitation with current SRS configurations is that the SRS transmissions can only be transmitted in contiguous physical resource blocks (PRBs), which limits the number of UEs that may be multiplexed in the same bandwidth.

According to further exemplary embodiments, the gNB configures the UE with an RPFS factor for the UE to determine a subset of PRBs on which to transmit the SRS, thus allowing for more UEs to be multiplexed on the same bandwidth.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
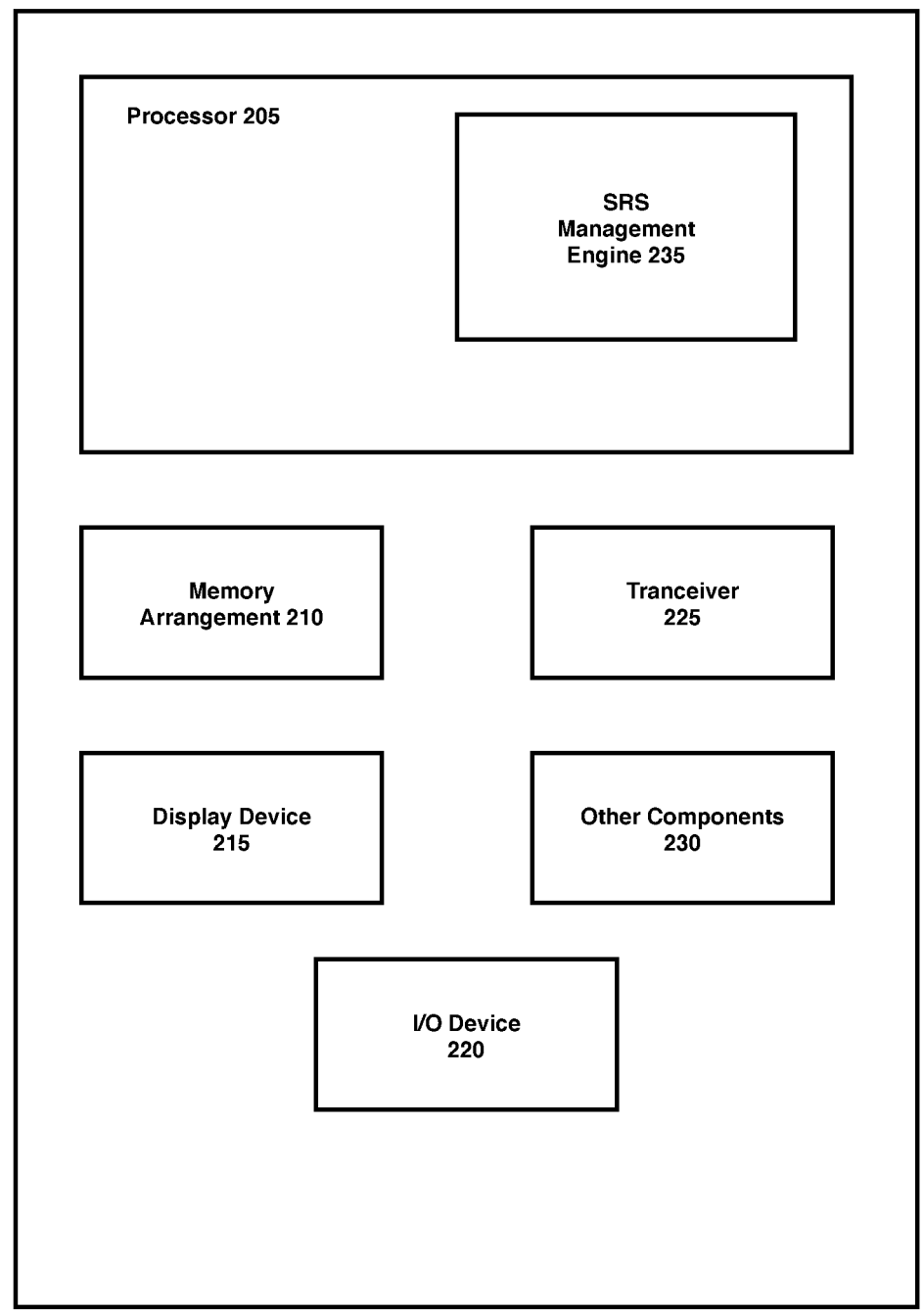
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include an SRS management engine 235. The SRS engine 235 may perform various operations related to receiving an SRS configuration transmission from the gNB 120A (or 120B) and transmitting the SRS to the gNB.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
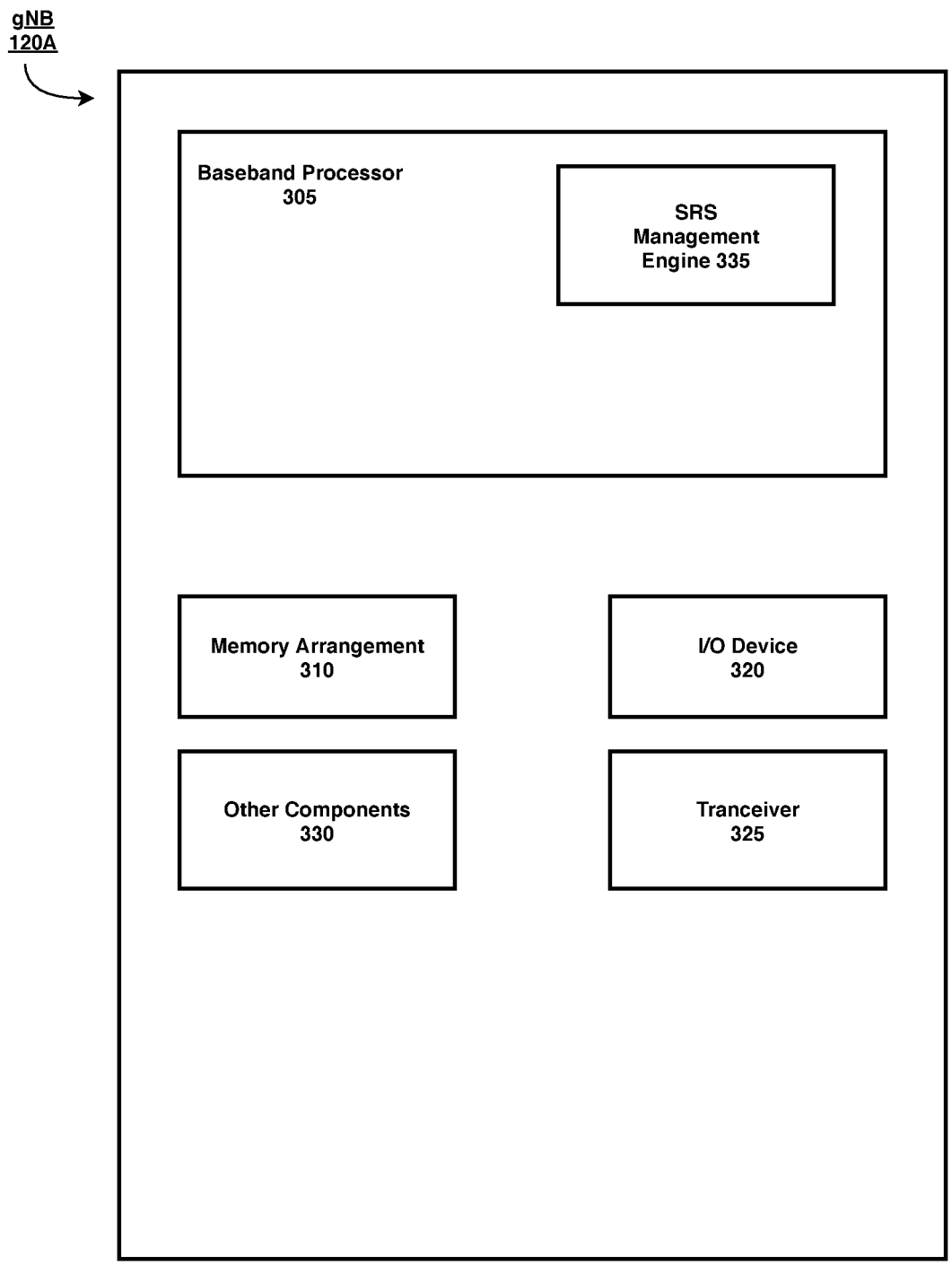
FIG. 3 shows an exemplary base station according to various exemplary embodiments.

FIG. 3 shows an exemplary network base station, in this case gNB 120A, according to various exemplary embodiments. The gNB 120A may represent any access node of the 5G NR network through which the UE 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include an SRS management engine 335 for performing operations including configuring a comb 8 SRS for and/or a RE-level partial frequency sounding (RPFS) for SRS transmissions of the UE 110. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
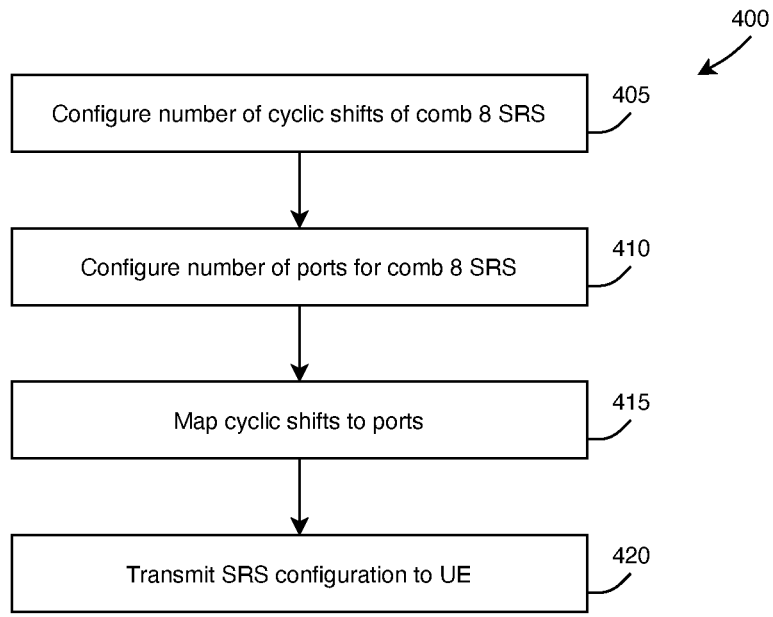
FIG. 4 shows a method of configuring a comb 8 sounding reference signal (SRS) according to various exemplary embodiments.

FIG. 4 shows a method 400 of configuring a comb 8 sounding reference signal (SRS) for the UE 110 according to various exemplary embodiments. At 405, the gNB 120A (or 120B) configures the number of cyclic shifts (a phase ramping) for the comb 8 SRS transmissions. In some embodiments, the gNB 120A configures the UE 110 with a maximum of six cyclic shifts (0, 1, 2, 3, 4, and 5) regardless of the SRS sequence length. In some embodiments, the gNB 120A may configure the maximum number of cyclic shifts based on the SRS sequence length to advantageously allow for the configuration of a greater number of ports for the SRS transmission. For example, in some embodiments, if the SRS sequence length is an integer multiple of 6 but not an integer multiple of 8 or 12, then the gNB 120A may configure the UE 110 with a maximum of six cyclic shifts. If the SRS sequence length is an integer multiple of 8 but not an integer multiple of 12, then the gNB 120A may configure the UE 110 with a maximum of eight cyclic shifts (0, 1, 2, 3, 4, 5, 6, 7). If the SRS sequence length is an integer multiple of 12, then the gNB 120A may configure the UE 110 with a maximum of twelve cyclic shifts (0, 1, 2, 3, 4, 5, 6, 7, 8, 9, 10, 11). In some embodiments, the minimum SRS subband size is configured to be 8 PRBs instead of the minimum 4 PRBs dictated by current 3GPP standards. In such an embodiment, the gNB 120A may configure the UE 110 with a maximum of twelve cyclic shifts (0, 1, 2, 3, 4, 5, 6, 7, 8, 9, 11).

At 410, the gNB 120A configures the number of ports for the comb 8 SRS transmission. In some embodiments, the gNB 120A configures the UE 110 with a maximum of two ports (1 or 2 ports) for SRS comb 8 transmissions having six cyclic shifts (since 6 is divisible by 1 or 2). In some embodiments, the gNB 120A configures the UE 110 with a maximum of four ports (1, 2, or 4 ports) for SRS comb 8 transmissions having eight or twelve cyclic shifts (since 8 and 12 are both divisible by 1, 2, or 4). In some embodiments, the gNB 120A may configure the UE with a maximum of six ports (in addition to 1 or 2 ports) for SRS transmissions when the maximum number of configured cyclic shifts is six. In some embodiments, when the minimum SRS subband size is configured to be 8 PRBs instead of the minimum 4 PRBs dictated by current 3GPP standards, the gNB 120A may configure the UE 110 with a maximum of four ports (1, 2, or 4) for the SRS transmissions.

At 415, the gNB 120A maps the configured cyclic shifts to the configured UE 110 ports. In some embodiments, the gNB 120A maps the cyclic shifts to the configured ports to ensure that the cyclic shifts are equally spaced apart when mapped to the ports. For example, when six cyclic shifts (0, 1, 2, 3, 4, are configured and two ports are configured, the gNB 120A may map the first port to 0 and the second port to 3 to ensure an equal distance between the mapped cyclic shifts. It should be noted that there are other mapping combinations that would also achieve this result (e.g., 1 and 4, 2 and 5, etc.). This equally spaced apart mapping is also applicable to embodiments in which a maximum of 8 and 12 cyclic shifts are configured with a maximum of 4 ports.

When comb 8 SRS transmissions are configured with a maximum of 6 cyclic shifts, the phase ramping values are defined by $$\frac{i}{3}\pi,$$

where i is the corresponding cyclic shift (0, 1, 2, 3, 4, 5). In some embodiments, the gNB 120A may alternatively explicitly configure the cyclic shift phase ramp for each SRS port. As a result, the gNB 120A may multiplex more users using the same comb offset compared with the equally spaced apart mapping described above. In such an embodiment, the gNB 120A may support a 6-port configuration when explicitly indicating the cyclic shift phase ramp as described.

In some embodiments, when comb 8 SRS transmissions are configured with a maximum of 6 cyclic shifts, in order to support a 4-port configuration, cyclicshift-n8 may be mapped to corresponding ports based on $$a_i = 2\pi \frac{n_{SRS}^{cs,i}}{n_{SRS}^{cs,max}}, \text{ where } n_{SRS}^{csi} = (n_{SRS}^{cs} + (p_i - 1000)) \bmod n_{SRS}^{cs,max}$$

where $\alpha_i$ is the phase ramp for SRS port i, $n_{SRS}^{cs,max}$ is the maximum number of cyclic shifts, $n_{SRS}^{cs}$ is configured cyclic shift (0, 1, 2, 3, 4, 5 for maximum 6 cyclic shifts), and $p_i$ is the port index for SRS port i. As a result, it is not necessary that the number of cyclic shifts be a integer multiple of the number of ports, thus allowing the gNB 120A to freely indicate the mapping of cyclic shifts to each port. At 420, the gNB 120A transmits the SRS configuration of 405-415 to the UE 110. The gNB 120A may include this SRS configuration in an RRC configuration message.

Figure 5:
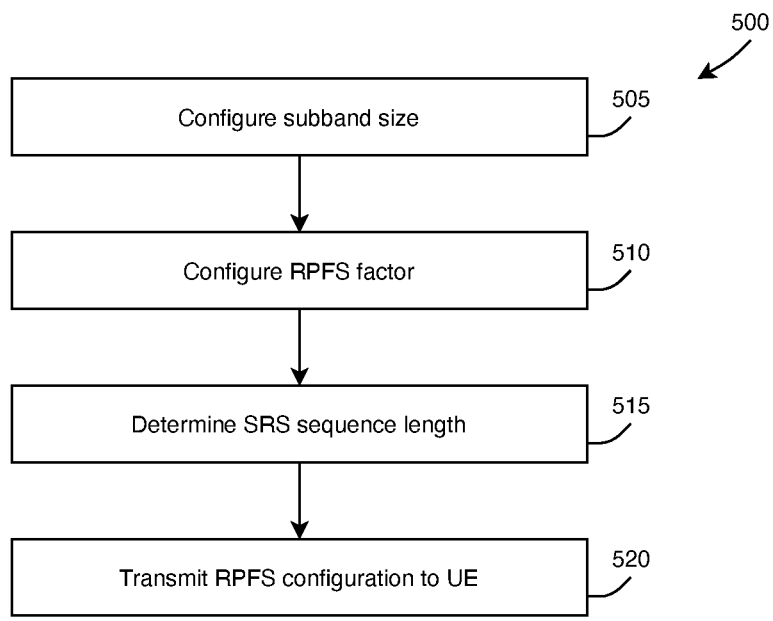
FIG. 5 shows a method of configuring resource block (RB)-level partial frequency sounding (RPFS) for SRS transmissions according to various exemplary embodiments.

FIG. 5 shows a method 500 of configuring resource block (RB)-level partial frequency sounding (RPFS) for SRS transmissions according to various exemplary embodiments. At 505, the gNB 120A configures the SRS subband size ($m_{SRS,B_{SRS}}$), which may be based on Table 6.4.1.4.3-1 of 3GPP TS 38.211. At 510, the gNB 120A configures an RPFS factor ($P_f$) such that the subband size divided by the RPFS factor $$\left(\frac{m_{SRS,B_{SRS}}}{P_f}\right)$$

yields the RPFS for the SRS transmission. In some embodiments, the determination of $P_f$ may be based on one or more constraints. In some embodiments, the one or more constraints may be that the resulting RPFS value must be an integer number. In some embodiments, the one or more constraints may additionally or alternatively be that the resulting RPFS value must be an integer multiple of 4. In some embodiments, the one or more constraints may additionally or alternatively be that the resulting RPFS value must be one of the subband sizes ($m_{SRS,B_{SRS}}$) listed in Table 6.4.1.4.3-1 of 3GPP TS 38.211. For example, if the configured subband size ($m_{SRS,B_{SRS}}$) is 224 and $P_f$ is 2, the RPFS would be 112, which is one of the subband sizes listed in Table 6.4.1.4.3-1 of 3GPP TS 38.211. In some embodiments, the one or more constraints may additionally or alternatively be that the resulting RPFS value must result in an SRS sequence length supported by 3GPP Release 16 (e.g., sequence length of 6, 12, 18, 24, ≥36). The sequence length can be determined based on $$\frac{12}{P_f * K_{TC}} m_{SRS,B_{SRS}}$$

where $K_{TC}$ is the comb size and 12 is the number of resource elements (REs) in a PRB. In the above example, an RPFS of 112, when the $P_f$ is 2 and the comb size ($K_{TC}$) is 4, yields a sequence length of 168, which is greater than 36 and satisfies this constraint.

In some embodiments, an RPFS $$\left(\frac{m_{SRS,B_{SRS}}}{P_f}\right)$$

having a non-integer value may be permitted. In such an embodiment, the RPFS may be rounded (floor, ceiling, or nearest) to one of the subband sizes ($m_{SRS,B_{SRS}}$) listed in Table 6.4.1.4.3-1 of 3GPP TS 38.211. For example, if the RPFS value is 86.5, the floor rounding of this value would yield subband size of 80, a ceiling rounding would yield a subband size of 88, and a nearest rounding would yield a subband size of 88. In some embodiments, the non-integer RPFS value may alternatively be rounded (floor, ceiling, or nearest) to the nearest integer that is a multiple of 4. In the above example of the RPFS value of 86.5, the floor rounding of this value would yield subband size of 84, a ceiling rounding would yield a subband size of 88, and a nearest rounding would yield a subband size of 88. In some embodiments, the non-integer RPFS value may alternatively be rounded (floor, ceiling, or nearest) to the nearest value that would yield an SRS sequence length supported by 3GPP Release 16 (e.g., sequence length of 6, 12, 18, 24, ≥36). In the above example of the RPFS value of 86.5 and a comb size ($K_{TC}$) of 4, a floor rounding would yield a subband size of 86, a ceiling rounding would yield a subband size of 87, and a nearest rounding would yield a subband size of 87.

At 515, the gNB 120A determines the SRS sequence length based on the RPFS value. If the RPFS $$\left(\frac{m_{SRS,B_{SRS}}}{P_f}\right)$$

value results in an SRS sequence length not supported by 3GPP Release 16 (e.g., sequence length of 6, 12, 18, 24, ≥36), then, in some embodiments, the RPFS value ($P_F$) is not permitted. In some embodiments, the resulting RPFS may alternatively be rounded (floor, ceiling, or nearest) to the nearest SRS sequence length supported by 3GPP Release 16 (e.g., sequence length of 6, 12, 18, 24, ≥36). For example, if the RPFS value results in an SRS sequence length of 14.7, then the floor rounding of that sequence length is 12, the ceiling rounding is 18, and the nearest rounding is 12. In some embodiments, the currently supported SRS sequence length is alternatively truncated. In such an embodiment, the sequence length resulting from the RPFS is rounded (floor, ceiling, or nearest) to an integer sequence length. Subsequently, a base sequence is selected from the currently supported SRS sequence lengths (6, 12, 18, 24, ≥36). In some embodiments, the base sequence that is as long as or longer than the sequence length resulting from the RPFS is selected. In some embodiments, the base sequence that is as long as or longer than the sequence length resulting from the RPFS is selected, except that the base sequence length must be greater than or equal to 36. Finally, the selected base sequence length is truncated. At 520, the gNB 120A transmits the RPFS configuration to the UE 110.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above-described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a base station configured to perform operations comprising:
   determining a sounding reference signal (SRS) configuration, comprising:
   a plurality of cyclic shifts for a comb 8 SRS;
   a plurality of user equipment (UE) ports for transmitting the comb 8 SRS; and
   a mapping of the plurality of cyclic shifts to the plurality of UE ports, when an SRS sequence length is an integer multiple of 6, the maximum number of the plurality of cyclic shifts is six cyclic shifts; and generating, for transmission to the UE, the SRS configuration.

2. The processor of claim 1, wherein the maximum number of the plurality of cyclic shifts is based on an SRS sequence length.

3. The processor of claim 2, wherein, when the SRS sequence length is an integer multiple of 6 but not an integer multiple of 8 or 12, a maximum number of the plurality of UE ports is two ports.

4. The processor of claim 2, wherein, when the SRS sequence length is an integer multiple of 8 but not an integer multiple of 12, the maximum number of the plurality of cyclic shifts is eight cyclic shifts and a maximum number of the plurality of UE ports is four ports.

5. The processor of claim 2, wherein, when the SRS sequence length is an integer multiple of 12, the maximum number of the plurality of cyclic shifts is twelve cyclic shifts and a maximum number of the plurality of UE ports is four ports.

6. The processor of claim 1, wherein a maximum number of the plurality of UE ports is six ports.

7. The processor of claim 1, wherein mapping the six cyclic shifts to the plurality of ports includes configuring a phase ramping value of $$\frac{i}{3}\pi$$

for each port, where i is a corresponding one of the six cyclic shifts.

8. The processor of claim 1, wherein a minimum subband size of the comb 8 SRS is eight physical resource blocks (PRBs).

9. The processor of claim 1, wherein the maximum number of the plurality of ports is four ports, the mapping includes configuring, for each of the four ports, a phase ramping value of $$a_i = 2\pi \frac{n_{SRS}^{cs,i}}{n_{SRS}^{cs,max}}, \text{ where } n_{SRS}^{cs,i} = (n_{SRS}^{cs} + (p_i - 1000)) \bmod n_{SRS}^{cs,max}$$

where $\alpha_i$ is a phase ramp for SRS port i, $n_{SRS}^{cs,max}$ is a maximum number of cyclic shifts, $n_{SRS}^{cs}$ is a configured one of the six cyclic shifts, and $p_i$ is a port index for SRS port i.

10. A base station, comprising:
a transceiver configured to communicate with a user equipment (UE); and
a processor communicatively coupled to the transceiver and configured to perform operations comprising:
determining a sounding reference signal (SRS) configuration, comprising:
a plurality of cyclic shifts for a comb 8 SRS;
a plurality of user equipment (UE) ports for transmitting the comb 8 SRS; and
a mapping of the plurality of cyclic shifts to the plurality of UE ports, when an SRS sequence length is an integer multiple of 6, the maximum number of the plurality of cyclic shifts is six cyclic shifts; and
transmitting the SRS configuration to the UE.

11. The base station of claim 10, wherein the maximum number of the plurality of cyclic shifts is based on an SRS sequence length.

12. The base station of claim 11, wherein, when the SRS sequence length is an integer multiple of 6 but not an integer multiple of 8 or 12, a maximum number of the plurality of UE ports is two ports.

13. The base station of claim 11, wherein, when the SRS sequence length is an integer multiple of 8 but not an integer multiple of 12, the maximum number of the plurality of cyclic shifts is eight cyclic shifts and a maximum number of the plurality of UE ports is four ports.

14. The base station of claim 11, wherein, when the SRS sequence length is an integer multiple of 12, the maximum number of the plurality of cyclic shifts is twelve cyclic shifts and a maximum number of the plurality of UE ports is four ports.

15. The base station of claim 10, wherein a maximum number of the plurality of UE ports is six ports.

16. The base station of claim 10, wherein mapping the six cyclic shifts to the plurality of ports includes configuring a phase ramping value of $$\frac{i}{3}\pi$$

for each port, where i is a corresponding one of the six cyclic shifts.

17. The base station of claim 10, wherein a minimum subband size of the comb 8 SRS is eight physical resource blocks (PRBs) and a maximum number of the plurality of ports is four ports.

18. The base station of claim 10, wherein the maximum number of the plurality of ports is four ports, the mapping includes configuring, for each of the four ports, a phase ramping value of $$a_i = 2\pi \frac{n_{SRS}^{cs,i}}{n_{SRS}^{cs,max}}, \text{ where } n_{SRS}^{cs,i} = (n_{SRS}^{cs} + (p_i - 1000)) \bmod n_{SRS}^{cs,max}$$

where $\alpha_i$ is a phase ramp for SRS port i, $n_{SRS}^{cs,max}$ is a maximum number of cyclic shifts, $n_{SRS}^{cs}$ is a configured one of the six cyclic shifts, and $p_i$ is a port index for SRS port i.

* * * * *